Oct. 9, 1962   H. A. C. HOGG   3,058,025
ELECTROSTATIC FOCUSSING DEVICES
Filed Dec. 17, 1958   2 Sheets-Sheet 1

INVENTOR
HAROLD ALEXANDER CECIL HOGG
BY
Kirschstein, Kirschstein & Ottinger
ATTORNEYS Oct. 9, 1962 H. A. C. HOGG 3,058,025
ELECTROSTATIC FOCUSSING DEVICES
Filed Dec. 17, 1958 2 Sheets-Sheet 2

INVENTOR
HAROLD ALEXANDER CECIL HOGG
BY Kirschstein, Kirschstein & Ottinger
ATTORNEYS

United States Patent Office 3,058,025
Patented Oct. 9, 1962

3,058,025
ELECTROSTATIC FOCUSSING DEVICES
Harold Alexander Cecil Hogg, Frinton-on-Sea, England, assignor to The M-O Valve Company Limited, London, England
Filed Dec. 17, 1958, Ser. No. 780,976
Claims priority, application Great Britain Jan. 1, 1958
3 Claims. (Cl. 315—3.6)

This invention relates to electrostatic focussing devices.

According to the present invention, an electrostatic focussing device includes a pair of periodic metal structures disposed with their lengths substantially parallel to each other so as to define between them a space through which an electron beam may travel, the gaps in each structure being disposed opposite the metal elements of the other structure, and two further metal structures extending on either side of the pair of periodic structures so that each periodic structure lies between the other periodic structure and one of the further metal structures, the arrangement being such that, upon applying suitable potentials to the periodic metal structures and the further metal structures and upon projecting an electron beam in a suitable manner into said space at one end, the beam travels through said space generally in a direction parallel to the lengths of the structures, and with an undulatory motion such that it approaches the two periodic structures in turn.

By a periodic metal structure is meant a series of similar metallic elements which are spaced apart along a given path (the length of the structure) and all of which extend in a similar manner transversely to said path. The elements may for example take the form of the turns of an elongated helix, the teeth of one or more comb-like structures, or the rungs of a ladder-like structure.

One arrangement in accordance with the present invention will now be described by way of example, with reference to the accompanying drawings, in which.

Figure 1:
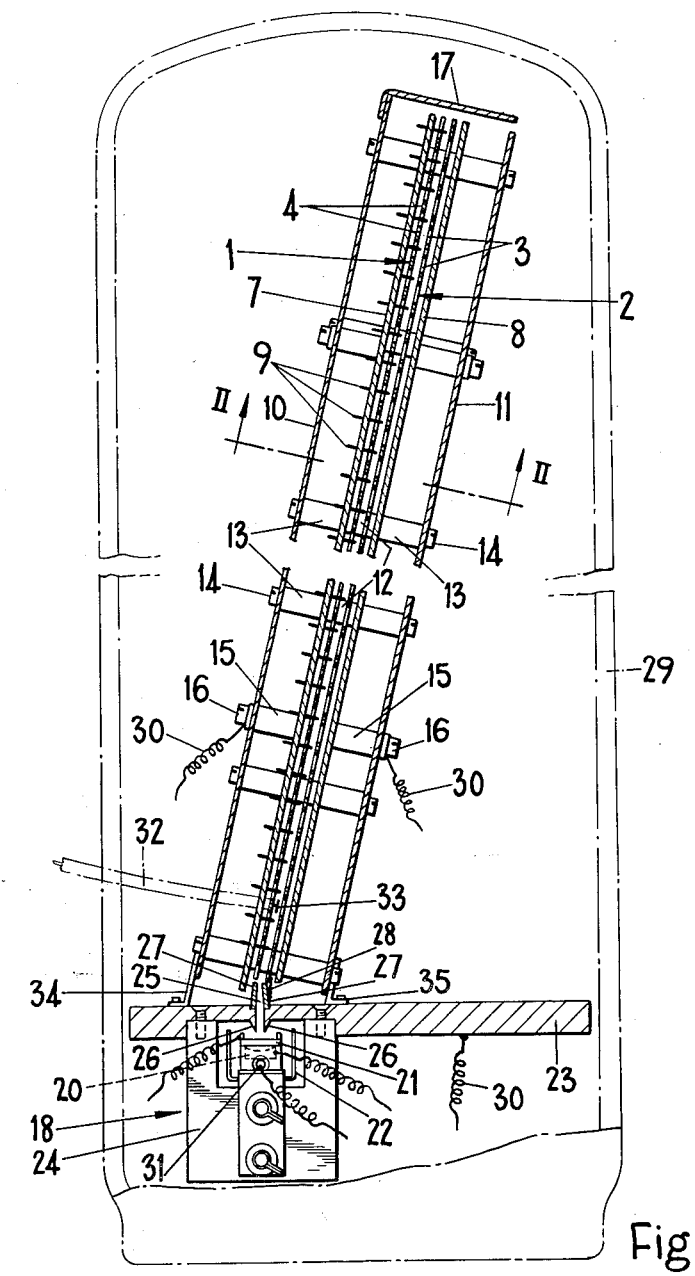
FIGURE 1 is a side elevation, shown partly in section, of an electrostatic focussing device in accordance with the invention associated with an electron gun, the section being taken along the longitudinal axis of the focussing device.
Figure 2:
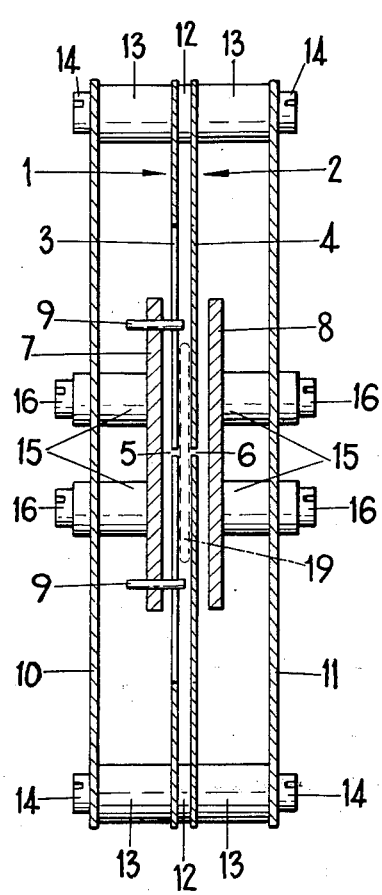
FIGURE 2 is a sectional elevation of the device, the section being taken along the line II—II of FIGURE 1.
Figure 3:
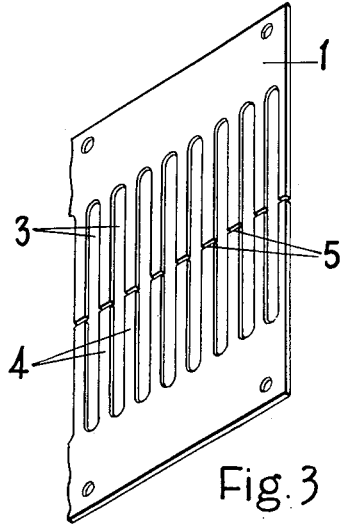
FIGURE 3 is a perspective view of part of one of the periodic metal structures.

Referring to the drawings, the electrostatic focussing device includes two periodic metal structures which are respectively formed by a pair of parallel rectangular molybdenum plates generally designated 1 and 2, each having a length of 22 centimetres, a width of 7.6 centimetres and a thickness of 0.03 centimetre. The plates 1 and 2 are spaced apart by a distance of 0.12 centimetre and are arranged so that their peripheries are in register. Each plate 1 or 2 has a series of apertures 3 formed in it, all the apertures 3 in the two plates 1 and 2 being similar in shape. As is clearly seen in FIGURE 3 of the drawings, each aperture 3 is substantially rectangular except that the shorter edges of each aperture 3 are rounded, the width of each aperture 3 being 0.28 centimetre and the length of each aperture 3 being about 4.6 centimetres. The apertures 3 of each plate 1 or 2 are spaced apart by distances equal to their widths with their long edges parallel and with corresponding ends of the apertures 3 of the plates 1 and 2 lying substantially in the same plane; thus in effect each plate 1 or 2 includes a series of parallel strips 4 spaced apart by the apertures 3 and the arrangement is such that the projection of each aperture 3 of one plate 1 or 2 on the other plate 2 or 1 is substantially coincident with a strip 4 of the other plate 2 or 1. Two saw cuts 5 and 6 are respectively formed along the longitudinal axes of the plates 1 and 2, the purpose of the saw cuts 5 and 6 being to inhibit buckling of the plates 1 and 2 due to thermal expansion.

A pair of solid parallel rectangular copper plates 7 and 8, having approximately the same overall length as the plates 1 or 2, are disposed on either side of, and parallel to, the pair of plates 1 and 2, each plate 7 or 8 being disposed 0.15 centimetre from the adjacent plate 1 or 2. The plates 7 and 8 have a width of 3 centimetres and are disposed symmetrically with respect to the longitudinal axes of the plates 1 and 2.

A number of molybdenum pins 9, each 0.1 centimetre in diameter, pass through and are secured to the plate 7. The arrangement is such that a pair of pins 9 project through each aperture 3 of the plate 1, each pair of pins 9 being symmetrically disposed with respect to the relevant aperture 3 and spaced 2.5 centimetres apart, and projecting approximately half way across the gap between the plates 1 and 2.

Two parallel rectangular molybdenum supporting plates 10 and 11 are disposed on either side of, and parallel to, the plates 7 and 8. The plates 1 and 2 are accurately spaced apart by a number of metal washers 12 and are respectively spaced from the plates 10 and 11 by a number of metal bushes 13, the plates 1 and 2 being secured to the plates 10 and 11 by a number of bolts 14. The plates 7 and 8 are respectively accurately spaced and electrically insulated from the plates 10 and 11 by a number of ceramic bushes 15, the plates 7 and 8 being respectively secured to the plates 10 and 11 by a number of bolts 16.

A collector plate 17 is secured to one end of the plate 10, the plate 17 extending perpendicularly with respect to the plates 1 and 2 and being spaced about 0.2 centimetre from the relevant end of each plate 1 or 2.

The device is associated with an electron gun generally designated 18 which is designed to produce a strip-like beam 19 of electrons.

The electron gun 18 includes an indirectly heated cathode 20, a focussing electrode 21 electrically connected to the cathode 20, a heat baffle 22, and a relatively massive anode plate 23. The cathode 20, focussing electrode 21, and baffle 22 are mounted on a metal support 24 which is secured to the anode plate 23. The anode plate 23 includes a strip-like aperture 25 through which the electron beam 19 emerges from the gun 18 in operation; the aperture 25 has a width of 3 centimetres and a depth of 0.2 centimetre, the width of the aperture 25 corresponding approximately with the width of the electron beam 19. The anode plate 23 includes two pairs of narrow projections 26 and 27 which extend along the width of the aperture 25 and which assist in operation in the forming of the electron beam 19.

That end of the assembly of the plates 1, 2, 7, 8, 10, and 11 remote from the collector plate 17 is secured to the anode plate 23 by means of two brackets 34 and 35, the arrangement being such that those ends of the plates 1 and 2 remote from the collector plate 17 are respectively disposed adjacent the pair of projections 27 so that the plates 1 and 2 define a space through which the electron beam 19 can travel. The assembly of the plates 1, 2, 7, 8, 10 and 11 is tilted with respect to the anode plate 23, so that the electron beam 19 is directed towards that aperture 3 of the plate 1 nearest the anode plate 23, the angle between the axis of said assembly and the adjacent main face of the anode plate 23 being about 76°. That end of the plate 7 adjacent the anode plate 23 projects slightly beyond the corresponding end of the plate 8 so that said end of the plate 7 overlaps the adjacent one of the pair of projections 27. A strip 28 of molybdenum foil is secured to that end of the plate 2 adjacent the anode plate 23, the strip 28 extending across the gap between the plate 2 and the adjacent one of the pair of projections 27 and bearing against this projection 27.

It will be appreciated that the plates 1, 2, 10, 11 and 17 and the anode plate 23 are all electrically connected together. The plates 7 and 8 are electrically connected together, but are electrically insulated with respect to the remainder of the focussing device.

The combination of the focussing device and the electron gun 18 is mounted in an evacuated glass envelope schematically indicated 29, and electrical leads schematically indicated 30 for the anode plate 23, the cathode 20, the heater 31 of the cathode 20, the focussing electrode 21 and the plates 7 and 8 are sealed through the wall of the envelope 29.

Figure 4:
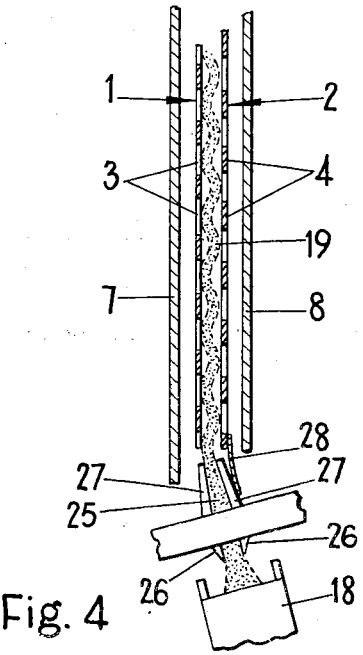
FIGURE 4 is a schematic representation of the device illustrating its mode of operation.

In operation, the anode plate 23, is earthed, an appropriate negative potential is applied to the cathode 20 and an appropriate negative potential is applied to the plates 7 and 8; the potential applied to the cathode 20 can be varied between 300 and 1200 volts and the potential applied to the plates 7 and 8 can be varied between 360 and 1400 volts, though the ratio of the potentials applied to the cathode 20 and the plates 7 and 8 should be kept substantially constant. The arrangement is such that the electron beam 19 is focussed by the focussing device as it travels along the space defined by the plates 1 and 2, the focussing action (which is illustrated in FIGURE 4) being brought about as follows. The application of the potentials to the plates 1 and 2 and the plates 7 and 8 causes an electrostatic field to be set up between each strip 4 of the plates 1 and 2 and each of the plates 7 and 8, the field being directed away from the strip 4 towards each of the plates 7 and 8. As stated above, the electron beam 19, after passing through the aperture 25 in the anode plate 23, is directed towards the first aperture 3 in the plate 1, and upon reaching the region of this aperture 3, the electron beam 19 is bent away from the adjacent plate 7 due to the electrostatic field between the plate 7 and that strip 4 of the plate 2 disposed opposite said aperture 3. Thus the electron beam 19 curves away from the above-mentioned aperture 3 and towards the first aperture 3 in the plate 2. Similarly upon reaching the region of the first aperture 3 in the plate 2, the electron beam 19 is bent away from the adjacent plate 8 due to the electrostatic field between the plate 8 and that strip 4 of the plate 1 disposed opposite the last-mentioned aperture 3 so that the beam 19 curves back towards the second aperture 3 in the plate 1. The electrostatic field distribution along the general direction of travel of the electron beam 19 is such that there is an overall focussing action upon the beam 19 in directions perpendicular to the plates 1 and 2. The electron beam 19 will thus curve first one way and then the other towards successive apertures 3 in the two plates 1 and 2 until the beam 19 is incident upon the collector plate 17. The electron beam 19 thus effectively travels along the space defined by the two plates 1 and 2 with an undulatory motion such that it approaches the two plates 1 and 2 in turn, the two sets of alternate peaks of the beam 19 being respectively disposed in the vicinities of the apertures 3 of the two plates 1 and 2.

It is found that, in the arrangement described above, there is no significant dispersion of the electrons in the electron beam in directions perpendicular to the plates 1 and 2 and that a large percentage of the electrons passing through the aperture 25 in the anode plate 23 are collected by the collector plate 17. The loss in transmission that does occur is mainly due to lateral dispersion of the beam 19 in directions substantially parallel to the plates 1 and 2; it should be appreciated that such dispersion is considerably reduced by virtue of the provision of the pins 9.

It should be appreciated that other arrangements in accordance with the present invention, but different to that described above by way of example, could also satisfactorily be used. Thus the periodic structures (which in the arrangement described above are formed by the plates 1 and 2) could be of generally cylindrical form rather than being planar, being constituted for example by co-axial helices; in this case the electron beam would be of annular cross-section. Alternatively, one or both of the periodic structures could be constituted by the digits of an interdigital structure.

It should be further appreciated that in some arrangements in accordance with the present invention it may be desired to vary the periodicity of each periodic structure along its length. In such a case it may be necessary to vary the spacing between each of the further metal structures (which in the arrangement described above are formed by the plates 7 and 8) and the adjacent periodic structure along the length of the periodic structure.

It should be understood that an electrostatic focussing device in accordance with the invention could be incorporated in a travelling wave tube, with at least one of the periodic structures forming at least part of a delay device along which an electromagnetic wave may be propagated so as to interact with an electron beam which is arranged to travel in the space defined by the periodic structures in a direction generally parallel to the lengths of the structures. An arrangement similar to that described above could be adapted for use as a travelling wave tube with an electromagnetic wave being arranged to travel along both of the plates 1 and 2. If the arrangement were adapted for use as a backward wave oscillator, means would be provided for extracting radio frequency energy from the oscillator at that end of the combination of the plates 1 and 2 adjacent the anode plate 23, while if the arrangement were adapted for use as an amplifier, means would be provided for applying a radio frequency signal to that end of the combination of the plates 1 and 2 nearer the anode plate 23 and for taking an output from the other end of the two plates 1 and 2.

One requirement of a travelling wave tube is that some form of focussing arrangement must be provided in order to prevent the electron beam from diverging unduly as it travels along the channel; for example in the case of a travelling wave tube employing a helix as a delay device, such focussing is commonly achieved by means of electromagnets arranged so that there is a strong magnetic field directed along the axis of the helix. The transmission ratio of the focussing device described above is sufficient for satisfactory operation of a travelling wave tube incorporating the device, and thus it will be appreciated that the present invention provides a convenient means for focussing an electron beam in a travelling wave tube.

Also, in order to achieve maximum interaction between the electron beam and the electromagnetic wave in a travelling wave tube, the beam should pass as close as possible to the gaps in the periodic structure forming the delay device since the axial electric field of the electromagnetic wave is at a maximum in the regions of these gaps. This requirement is especially important in backward wave oscillators, since the space-harmonics of the field of the electromagnetic wave decay more rapidly away from the structure than the fundamental component of the field, and, in such a device, the electron beam is usually arranged to interact with a reverse space-harmonic of the field; by a reverse space-harmonic is meant a space-harmonic whose phase and group velocities are directed in opposite senses. The achievements of such maximum interaction however involves certain difficulties. For example, where the electron beam travels in a rectilinear direction, the gaps in the periodic structure are shielded from the electron beam by the elements between which the gaps are formed. Such shielding may be reduced by making each element very thin in a direction perpendicular to the direction of travel of the electron beam, but in such a case the periodic structure will be relatively mechanically weak and will have a low thermal capacity so that distortion or even melting of the elements may occur.

The present invention enables such difficulties to be alleviated by making use of a focussing device in accordance with the invention in which in operation the two sets of alternate peaks of the beam are respectively disposed in the vicinities of the gaps in the two periodic structures; it will be appreciated that if a travelling wave tube incorporates such a focussing device, in operation each peak of the undulatory electron beam coincides with a region of maximum axial electric field so that there is very good interaction between the electron beam and the electromagnetic wave without the necessity of making the elements forming the periodic structures very thin.

The arrangement described above has been operated as a backward wave oscillator. The means for extracting radio frequency energy from the oscillator was in the form of a co-axial line schematically indicated 32 sealed through the wall of the envelope 29, that end portion of the inner conductor 33 of the line 32 disposed inside the envelope 29 being bent into the form of a loop disposed between the plates 1 and 2 near the anode plate 23 and in a plane substantially parallel to the plates 1 and 2. The frequency of the output of the oscillator lay within the range 1.4 to 2.5 kmc./s., potentials corresponding to the lower limits specified above being applied to the cathode 20 and the plates 7 and 8 when the oscillator was arranged to operate at the lower limit of its frequency range and potentials corresponding to the upper limits specified above being applied when the oscillator was arranged to operate at the upper limit of its frequency range.

I claim:
1. An electrostatic focussing device including:
   (a) a pair of periodic metal structures disposed with their lengths substantially parallel to each other and separated by a linearly clear space through which an electron beam may travel, the gaps in each structure being disposed opposite the metal elements of the other structure, and each structure being so constructed that the elements of the structure are all permanently electrically connected together,
   (b) two further metal structures extending on either side of and electrically insulated from the pair of periodic structures so that each periodic structure lies between the other periodic structure and one of the further metal structures,
   (c) the arrangement being such that, upon applying suitable potentials to the periodic metal structures and the further metal structures so that each of the periodic structures is at a positive potential with respect to the further metal structures and upon projecting an electron beam in a suitable manner into said space at one end, the beam travels through said space generally in a direction parallel to the length of the structures, and with an undulatory motion such that it approaches the two periodic structures in turn,
   (d) and electrically conductive means which is electrically insulated from the periodic structures and which extends along either side of said space in such a manner that, upon applying a suitable potential to said means so that said means is at a negative potential with respect to the periodic structures, said means serves to inhibit lateral dispersion of the beam as the beam travels through said space.

2. A travelling wave tube including an evacuated envelope, an electrostatic focussing device in accordance with claim 1 disposed in the envelope, and an electron gun disposed in the envelope and arranged to produce said electron beam, at least one of the periodic structures of the electrostatic focussing device forming at least part of a delay device along which an electromagnetic wave may be propagated so as to interact with said electron beam.

3. An electrostatic focussing device including:
   (a) a pair of periodic metal structures disposed with their lengths substantially parallel to each other and separated by a linearly clear space through which an electron beam may travel, the gaps in each structure being disposed opposite the metal elements of the other structure, and each structure being so constructed that the elements of the structure are all permanently electrically connected together,
   (b) two further metal structures extending on either side of and electrically insulated from the pair of periodic structures so that each periodic structure lies between the other periodic structure and one of the further metal structures.
   (c) the arrangement being such that, upon applying suitable potentials to the periodic metal structures and the further metal structures so that each of the periodic structures is at a positive potential with respect to the further metal structures and upon projecting an electron beam in a suitable manner into said space at one end, the beam travels through said space generally in a direction parallel to the lengths of the structures, and with an undulatory motion such that it approaches the two periodic structures in turn,
   (d) and means for inhibiting lateral dispersion of the beam as the beam travels through said space, said means taking the form of two series of metal pins which are electrically connected to one of said further metal structures and which extend through the gaps in the adjacent periodic structure, the two series of pins being spaced apart in a direction perpendicular to the length of each periodic structure and being so arranged that in operation the beam travels between the two series of pins.

References Cited in the file of this patent

UNITED STATES PATENTS

| | | |
|---|---|---|
| 2,708,236 | Pierce | May 10, 1955 |
| 2,823,332 | Fletcher | Feb. 11, 1958 |
| 2,857,548 | Kompfner et al. | Oct. 21, 1958 |
| 2,890,374 | Charles et al. | June 9, 1959 |
| 2,899,597 | Kompfner | Aug. 11, 1959 |
| 2,951,964 | Quate | Sept. 6, 1960 |

FOREIGN PATENTS

| | | |
|---|---|---|
| 1,129,331 | France | Sept. 3, 1956 |
| 776,072 | Great Britain | June 5, 1957 |